United States Patent [19]

Seniō

[11] Patent Number: 4,907,109
[45] Date of Patent: Mar. 6, 1990

[54] MAGNETIC DISC DRIVE SYSTEM HAVING AUTOMATIC OFFSET AND GAIN ADJUSTMENT MEANS

[75] Inventor: Keiicho Seniō, Yokohama, Japan
[73] Assignee: Fujitsu Limited, Kawasaki, Japan
[21] Appl. No.: 133,648
[22] Filed: Dec. 16, 1987
[30] Foreign Application Priority Data
Dec. 16, 1986 [JP] Japan .................... 61-299594
[51] Int. Cl.$^4$ ............... G11B 5/55; G11B 5/596
[52] U.S. Cl. ............... 360/78.04; 360/77.04; 360/78.07; 360/78.12
[58] Field of Search ............ 360/77.02, 77.03, 77.04, 360/77.05, 77.06, 77.07, 77.08, 77.11, 78.04, 78.05, 78.06, 78.07, 78.08, 78.09, 78.11, 78.12, 78.13, 78.14; 318/561, 592, 615

[56] References Cited
U.S. PATENT DOCUMENTS
4,135,217  1/1979  Jacques et al. ............... 360/77.04
4,594,622  6/1986  Wallis ............... 360/77.08

*Primary Examiner*—Alan Faber
*Assistant Examiner*—Steven R. Garland
*Attorney, Agent, or Firm*—Staas & Halsey

[57] ABSTRACT

A magnetic disc drive system includes a magnetic head, an actuator for moving the magnetic head, a control current detection circuit detecting a control current flowing through the actuator, a position signal generation circuit generating a position signal of the magnetic head, a speed control unit effecting a seek control, and a position control unit effecting a fine position control after completion of the seek control. The magnetic disc drive system includes units which, immediately upon receipt of a power supply and before receipt of a seek command, measure one or more position offset values along one or more cylinders on a magnetic disc. This is accomplished by detecting the control current from the control current detection circuit when the position of the magnetic head is controlled under the fine position control, and calculating one or more offset correction values and outputting the calculated offset correction values to the speed control unit and the position control unit. The magnetic disc drive system may further include an automatic speed control gain adjustment unit, which after completion of the offset correction value calculation, determines a speed control gain used in the speed control unit by seeking the magnetic head to a predetermined cylinder under application of the calculated offset values and measuring a time for the seek which meets a requirement of a reference seek time.

4 Claims, 16 Drawing Sheets

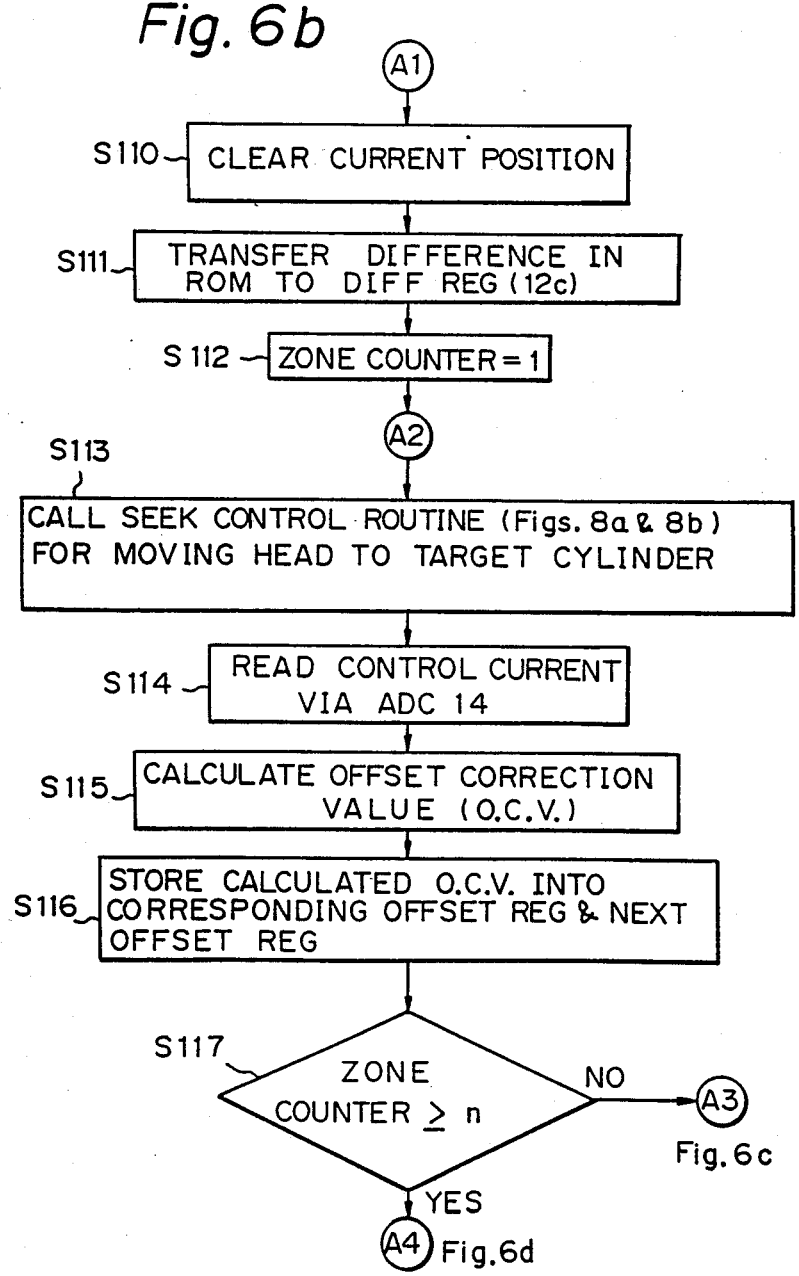

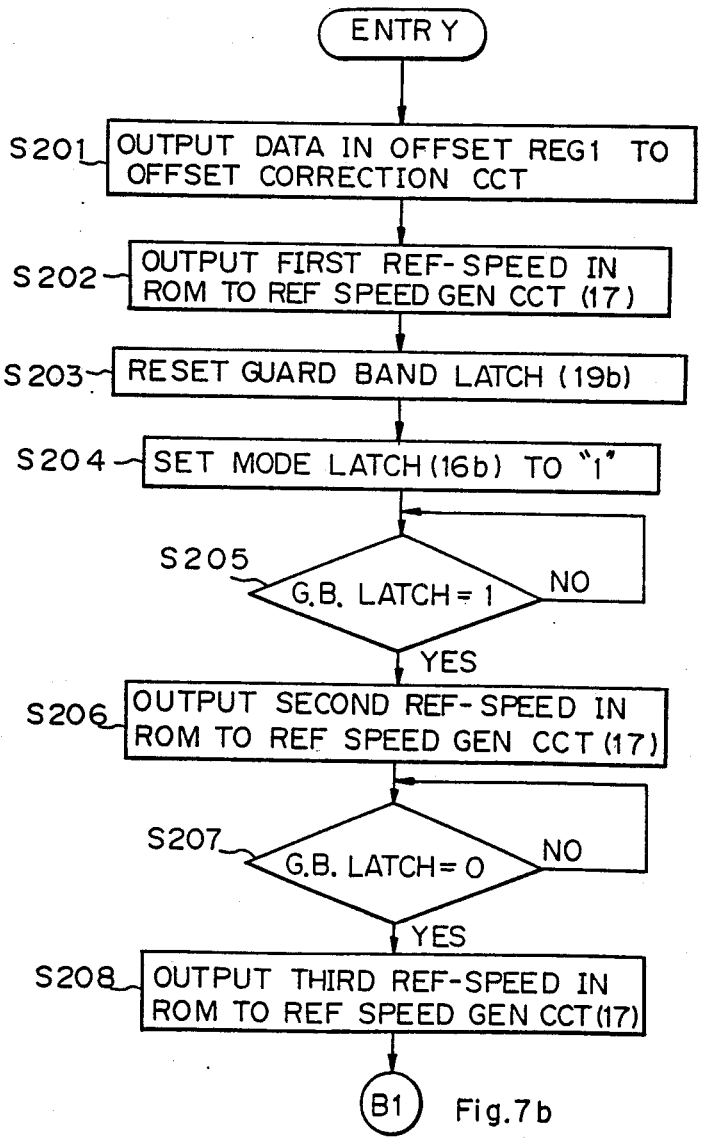

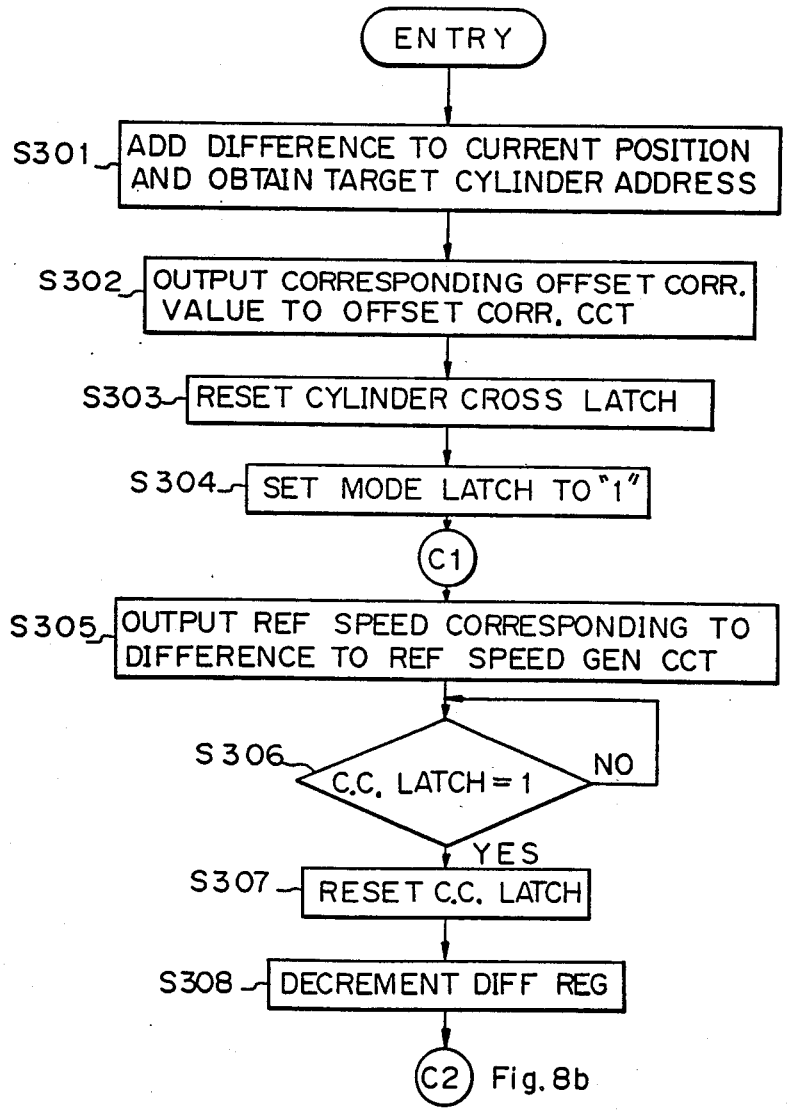

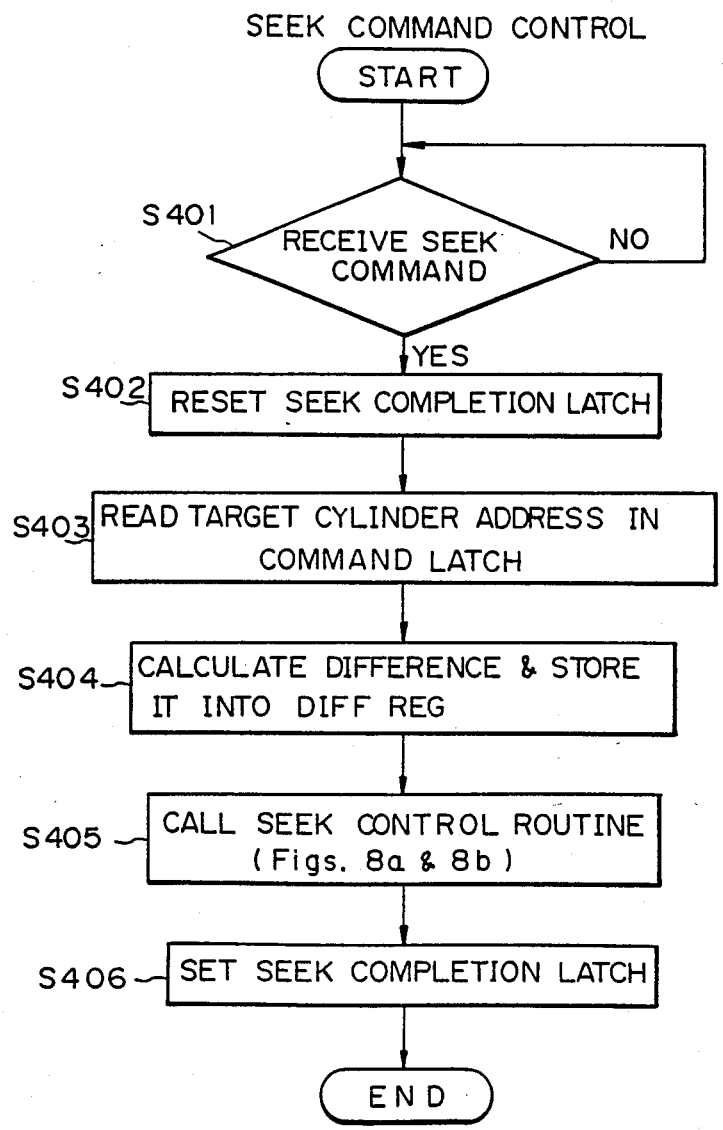

MAGNETIC DISC DRIVE SYSTEM HAVING AUTOMATIC OFFSET AND GAIN ADJUSTMENT MEANS

BACKGROUND OF THE INVENTION

1. Field of the Invention

The present invention relates to a magnetic disc system. More particularly, it relates to a magnetic disc drive system in the magnetic disc and has means for automatically determining offset correction values and a speed control gain correction value for controlling magnetic heads using the same.

2. Description of the Related Art

A magnetic disc mechanism has an offset based on the characteristics of a spring provided for restoring magnetic heads to a rest position during a stop mode. The offset is also based on the characteristics of a voice coil motor (VCM) used as an actuator for driving the magnetic heads. To realize a precise seek (speed) control and a precise position control, an offset correction must be made. The offset depends on the individual magnetic disc mechanism, and thus, before shipping a magnetic disc system, a measurement of the offset and a determination of an offset correction value must be carried out for each magnetic disc system.

A speed control gain also depends on the individual magnetic disc system, and accordingly, before shipping the magnetic disc system, a determination of an optimum speed control gain for each magnetic disc system must be carried out.

In a prior art system, the offset measurement and the offset correction value determination are manually effected, thus having the disadvantages of a troublesome manual operation and a long adjustment time. Similarly, the determination of the optimum speed control gain is manually effected, and thus also has the same disadvantages.

In addition, if a problem, which may require a replacement of parts and thus requires a repeat of the above adjustment, occurs on site, the adjustment process must be carried out at the site.

The offset of every magnetic disc mechanism depends on a radial position of the heads or cylinder position. However, in the prior art, only a single offset correction value is determined. As a result, an optimum offset correction for all cylinders cannot be achieved.

SUMMARY OF THE INVENTION

An object of the present invention is to provide a magnetic disc drive system having a means for automatically adjusting an offset and a speed control gain.

Another object of the present invention is to provide a magnetic disc drive system which carries out an optimum offset correction, in addition to the above automatic adjustment.

According to the present invention, there is provided a magnetic disc drive system including: a magnetic head; an actuator for moving the magnetic head; a control current detection circuit detecting a control current flowing through the actuator; a position signal generation circuit generating a position signal of the magnetic head; a speed control unit effecting a seek control; a position control unit effecting a fine position control after completion of the seek control; and offset adjustment means, operatively connected to the speed control unit, the position control unit, the control current detection circuit and the position signal generation circuit, operating immediately upon receipt of a power supply and before receipt of a seek command, for measuring one or more position offset values along one or more cylinders of a magnetic disc by detecting the control current from the control current detection circuit when the position of the magnetic head is controlled under the fine position control, and calculating one or more offset correction values and outputting at least one calculated offset correction value to the speed control unit and the position control unit. After completion of the offset correction calculation, a seek control for a normal seek command can be carried out by using the calculated offset correction values. Also, a fine position control after completion of the normal seek control can be carried out by using the calculated offset correction values.

The magnetic disc drive system may further include means, operatively connected to the speed control unit and the position signal generation circuit, for determining, after completion of the offset correction value calculation by the offset adjustment means, a speed control gain used in the speed control unit by seeking the magnetic head at a predetermined cylinder in accordance with the calculated offset values and by measuring a time for the seek which meets a requirement of a reference seek time. After completion of the speed control gain adjustment, a seek control for a normal seek command can be carried out by using the adjusted speed control gain.

The speed control gain adjustment means may include a plurality of resistors connected in parallel by a plurality of switches each serially connected to a corresponding resistor. The resistors may have a predetermined relationship of respective resistance values, and a combination of the resistances of the parallel-connected resistors defines the speed control gain.

The offset adjustment can be carried out along a plurality of cylinder zones.

BRIEF DESCRIPTION OF THE DRAWINGS

Other objects and features of the present invention will be described below in detail with reference to the accompanying drawings, in which:

FIGS. 6a to 6g are flow charts explaining an offset correction adjustment and a speed control gain adjustment which are carried out by the magnetic disc drive system shown in FIGS. 3 to 5;

FIGS. 7a and 7b are flow charts explaining a return to zero control applied in the magnetic disc drive system shown in FIGS. 3 to 5;

FIGS. 8a and 8b are flow charts explaining a seek control applied in the magnetic disc drive system shown in FIGS. 3 to 5;

FIG. 11 is a flow chart explaining a seek command control applied in the magnetic disc drive system shown in FIGS. 3 to 5.

DESCRIPTION OF THE PREFERRED EMBODIMENTS

Before describing the preferred embodiments of the present invention, an example of a prior art magnetic disc drive system is described with reference to the drawings, for comparison.

Figure 1:
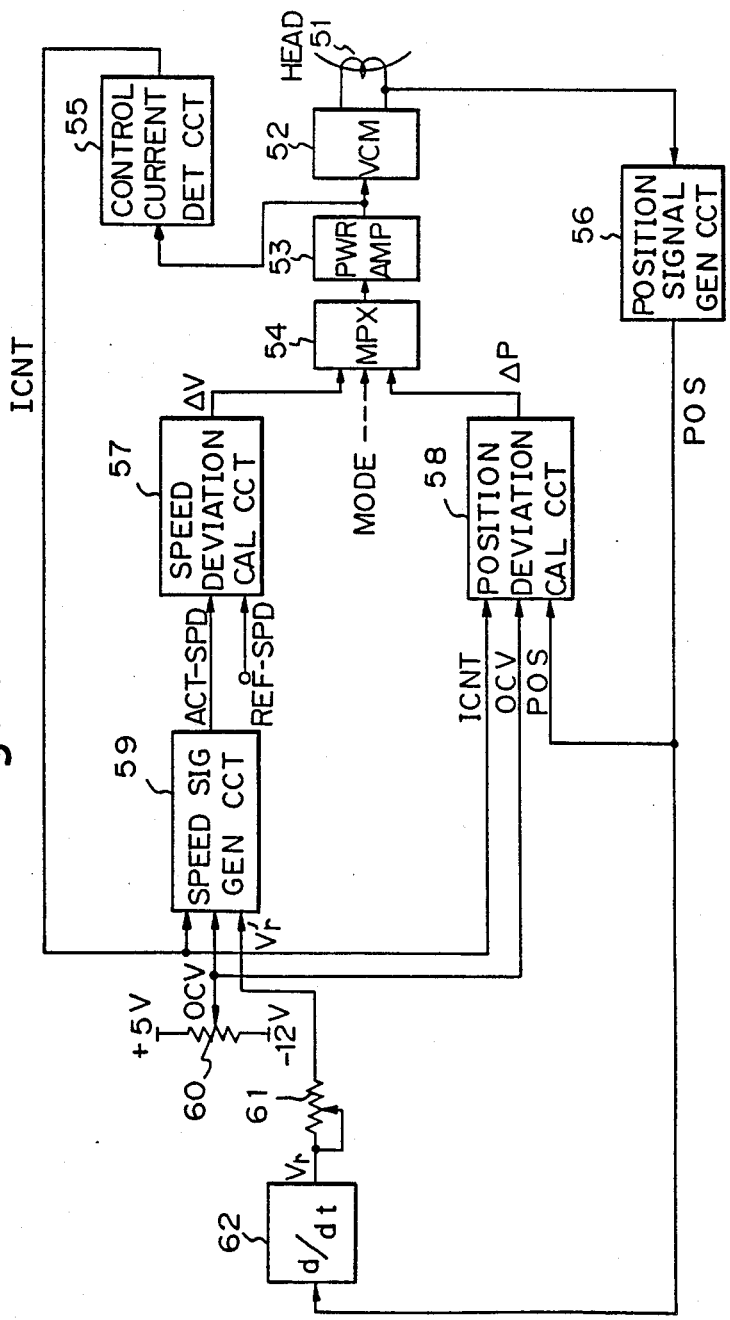
FIG. 1 is a schematic view of a prior art magnetic disc drive system.

FIG. 1 shows a prior art magnetic drive system. In FIG. 1, reference 51 denotes a magnetic head, 52 a voice coil motor (VCM), 53 a power amplifier, 54 a multiplexer, 55 a control current detection circuit, 56 a position signal generation circuit, 57 a speed deviation calculation circuit, 58 a position deviation calculation circuit, 59 a speed signal generation circuit, 60 a position offset adjustment circuit, 61 a speed control gain adjustment circuit, and 62 a differential circuit.

The multiplexer 54 selects an output from the speed deviation calculation circuit 57 when a MODE signal is "1", indicating a coarse control, i.e., a seek control, or an output from the position deviation calculation circuit 58 when the MODE signal is "0", indicating a fine control, i.e., a position control after completion of the seek control. The control current detection circuit 55 detects a current flowing through the VCM 52 and generates a control current ICNT. The position signal generation circuit 56 detects a position of the head 51 and generates a position signal POS, a cylinder cross signal and a guard band signal. The differential circuit 62 differentiates the position signal POS from the position signal generation circuit 56 and provides a raw speed signal Vr. The speed signal generation circuit 59 receives the control current ICNT, a position offset correction value OCV from the position offset adjustment circuit 60, and a speed signal Vr' which is gain-adjusted at the speed gain adjustment circuit 61 to the raw speed signal Vr, and generates a corrected actual speed signal ACT-SPD. The speed deviation calculation circuit 57 receives a reference (or target) speed REF-SPD and the corrected actual speed signal ACT-SPD, calculates a speed deviation ΔV: (REF-SPD)—(ACT-SPD), and outputs same to the multiplexer 54. The position deviation calculation circuit 58 receives the control current signal ICNT, the position offset correction value OCV, and the position signal POS, calculates a position deviation ΔP, and outputs same to the multiplexer 54.

The position offset adjustment circuit 60 is formed by a variable resistor connected between a +5 V power supply and a −12 V power supply. The speed control gain adjustment circuit 61 is also formed by a variable resistor.

The control current ICNT under the fine control mode indicates a position offset. This is because, under the fine control mode, a position error is very small and the current flowing through the VCM 52 should be zero. However, but if a current flows into the VCM 52 it is used for keeping the magnetic head at a target cylinder position and for resisting a force of a spring (not shown) mechanically connected to the magnetic head 51. Therefore, the offset is obtained by measuring the control current. The actual offset is shown as curve CV1 in FIG. 2. The offset depends on the cylinder position, and the offset is at a maximum value at an outer cylinder.

Figure 2:
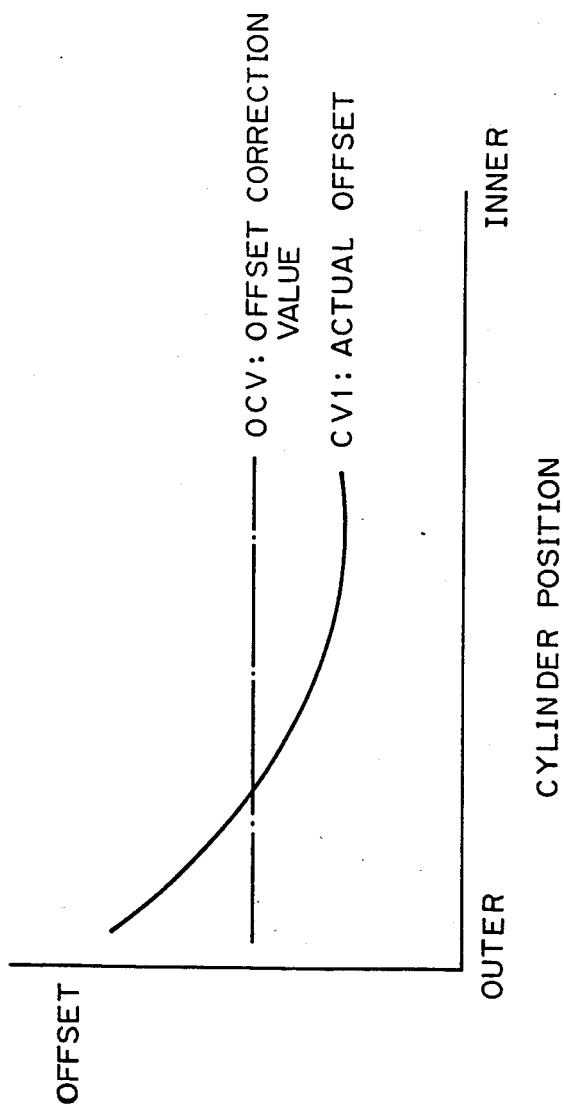
FIG. 2 is a graph representing an offset correction value of the prior art.

In a prior art system, an inspector measures the offset by observation with a synchroscope and other measuring devices, and determines a tap position of the variable resistor 60 to define the offset correction value OCV shown in FIG. 2. This operation is long and troublesome. In addition, the offset correction value OCV is a single value, and thus does not provide an optimum offset correction for all cylinder positions.

The variable resistor 61 is adjusted to correspond to a seek time within a predetermined time. This requires many seek operations and measurement of seek time by changing the variable resistor 61. This operation is also long and troublesome.

Now, a preferred embodiment of a magnetic disc drive system in accordance with the present invention will be described.

Figure 3:
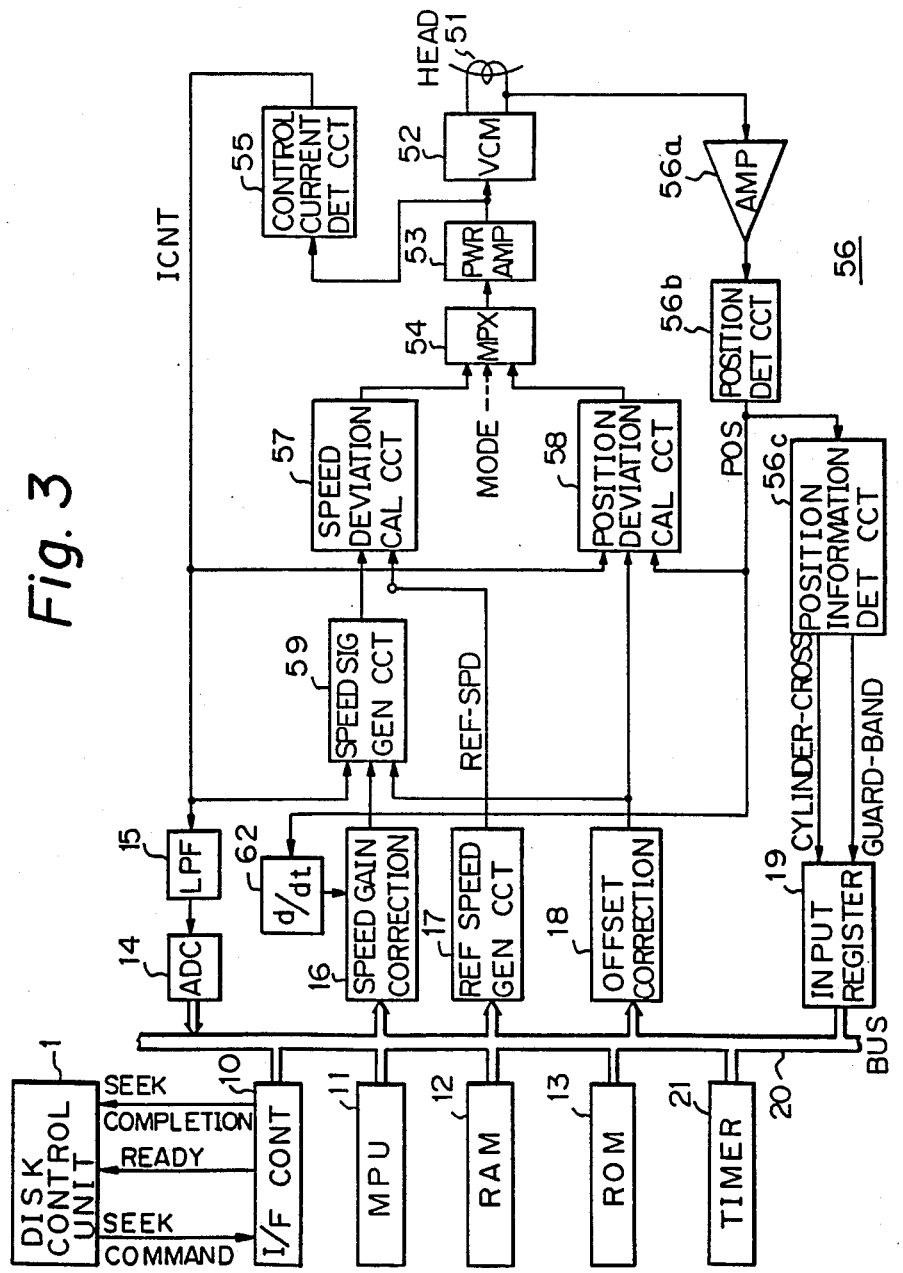
FIG. 3 is a schematic diagram of an embodiment of a magnetic disc drive system in accordance with the present invention.

Referring to FIG. 3, the magnetic disc drive system includes the magnetic head 51, the voice coil motor (VCM) 52, the power amplifier 53, the multiplexer 54, the current control detection circuit 55, the speed deviation calculation circuit 57, the position deviation calculation circuit 58, the speed signal generation circuit 59 and the differential circuit 62. These are substantially the same as those elements described above with reference to FIG. 1, and thus a description thereof is omitted.

The position signal generation circuit 56 includes a servo head (not shown), an amplifier 56a, a position detection circuit 56b and a position information detection circuit 56c. The position detection circuit 56b detects a position of the magnetic head 51 driven by the VCM 52 on the basis of an output of the servo head, and outputs a position signal POS. The position information detection circuit 56c receives the position signal POS and generates a cylinder cross signal CYLINDER-CROSS and a guard band signal GUARD-BAND. The cylinder cross signal CYLINDER-CROSS indicates that the magnetic head 51 has moved across a cylinder. The guard band signal GUARD-BAND indicates that the magnetic head 51 has reached an inner guard band at which the magnetic head 51 is in a rest position.

The magnetic disc drive system further includes an interface (I/F) control circuit 10, a microprocessor unit (MPU) 11, a random-access-memory (RAM) 12, a read-only-memory (ROM) 13, an analog-to-digital converter (ADC) 14, a speed control gain correction circuit 16, a reference speed generation circuit 17, a position offset correction circuit 18, an input register circuit 19, a timer 21 and a bus 20 interconnecting the above elements. The control current ICNT is supplied to the ADC 14 through a low pass filter 15. The control current ICNT having an analog value is converted to a digital value at the ADC 14 and stored in the RAM 12 as a position offset. The I/F control circuit 10 is connected to a disc control unit 1. The input register circuit 19 receives the cylinder cross signal CYLINDER-CROSS and the guard band signal GUARD-BAND.

Figure 4:
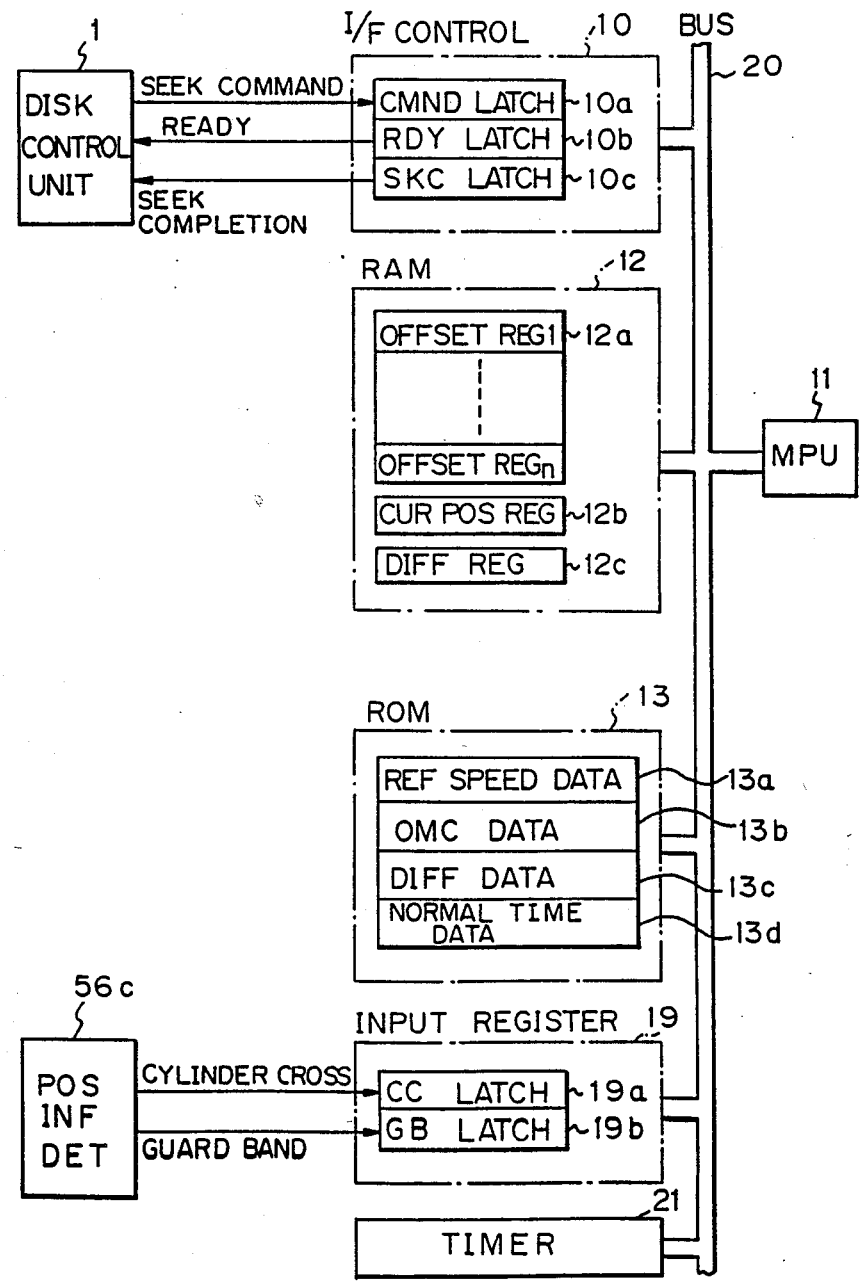
FIGS. 4 and 5 are detailed schematic diagrams representing a part of the magnetic disc drive system shown in FIG. 3.
Figure 5:
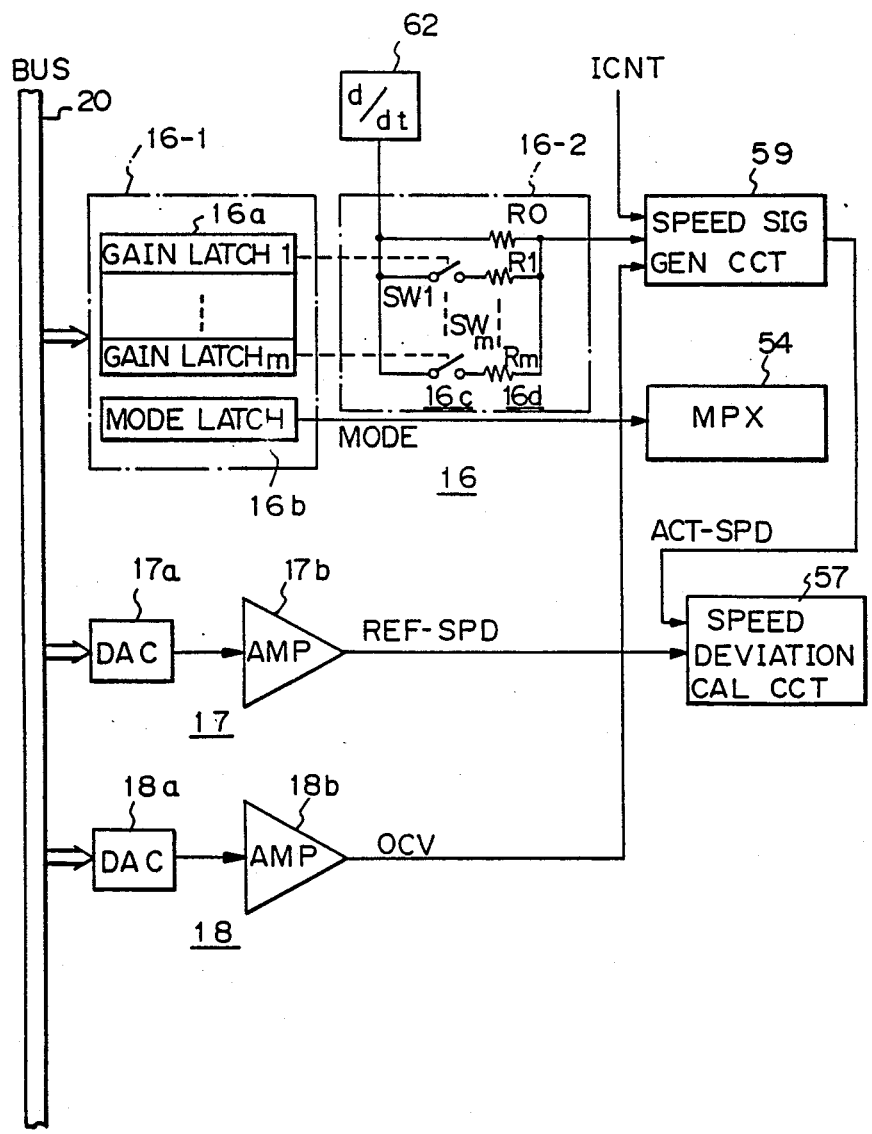

Referring to FIGS. 4 and 5, a more specific circuit construction will be described.

In FIG. 4, the I/F control circuit 10 includes a seek command latch 10a receiving and holding a SEEK COMMAND from the disc control unit 1, a ready signal latch 10b holding and outputting a READY signal to the disc control unit 1, and a seek completion signal latch 10c holding and outputting a SEEK COMPLETION signal to the disc control unit 1. The RAM 12 includes an offset register portion 12a, a current position register portion 12b, and a difference register portion 12c. The offset register portion 12a has 1 to n offset registers, a first offset register saving an offset value of a first cylinder block (zone): an inner cylinder block and the n-th offset register saving an offset value of an n-th cylinder block: and, an outer cylinder block. These offset values are input through the ADC 14. The current position register portion 12b stores a current position of the magnetic head 51. The difference register portion 12c saves a position difference ΔD of the magnetic head 1 to a position of a target cylinder: ΔD=(REFERENCE POSITION)−(CURRENT POSITION). The REFERENCE POSITION is previously saved in the ROM 13. The CURRENT POSITION is saved in the current position register portion 12b. The timer 21 is used for measuring a seek time. The ROM 13 stores programs for performing the speed gain adjustment, the position offset adjustment, and the like. These programs are loaded into the MPU 11 and are executed therein. The ROM 13 also stores reference speed data 13a, cylinder position data 13b for measuring offsets, difference data 13c for testing a speed gain, normal time data 13d for evaluating seek time, and reference position data 13e. The input register circuit 19 includes a cylinder cross signal latch 19a holding the CYLINDER CROSS signal from the position information detection circuit 56c, and a guard band signal latch 19b holding the GUARD-BAND signal.

In FIG. 5, the speed gain correction circuit 16 includes an output register circuit 16-1 and a speed gain selector 16-2. The output register circuit 16-1 has a gain selection latch circuit 16a consisting of m gain selection latches, and a mode latch 16b. The speed gain selector 16-2 has a resistor R0 and individual branches of series-connected switch SW1 and resistor R1 to series-connected switch SWm and resistor Rm. Each branch is connected in parallel to resistor R0. The values of these resistors are defined by the following relationships:

$$R1 = 2 \cdot R0$$
$$R2 = 2 \cdot R1$$
$$\vdots$$
$$Rm = 2 \cdot Rm - 1$$

The switches SW1 to SWm are independently energized by outputs from the gain selection latches. If m=4, the speed gain can be varied between 1 and 32. The mode latch 16b saves the MODE signal which is "1" during the seek operation or "0" during the fine control, and outputs the same to the multiplexer 54. The reference speed generation circuit 17 consists of a digital-to-analog converter (DAC) 17a and a drive amplifier 17b, and supplies the reference speed REF-SPD to the speed deviation calculation circuit 57. The position offset correction circuit 18 consists of a DAC 18a and a drive amplifier 18b, and outputs the position offset correction value OCV on the basis of data stored in the offset register portion 12a of FIG. 4.

The automatic position offset adjustment and the automatic speed gain adjustment of the magnetic disc drive system shown in FIGS. 3 to 5 will be described.

The above adjustment will be automatically effected in response to a power ON in the magnetic disc drive system. First, the automatic position offset adjustment can be effected, and then the automatic speed gain adjustment can be effected by using the obtained offset correction values. During the adjustment, the seek operation from the disc control unit 1 is inhibited.

A more concrete description of the operation will be given with reference to FIGS. 4, 5 and 6a to 10.

Figure 6A:
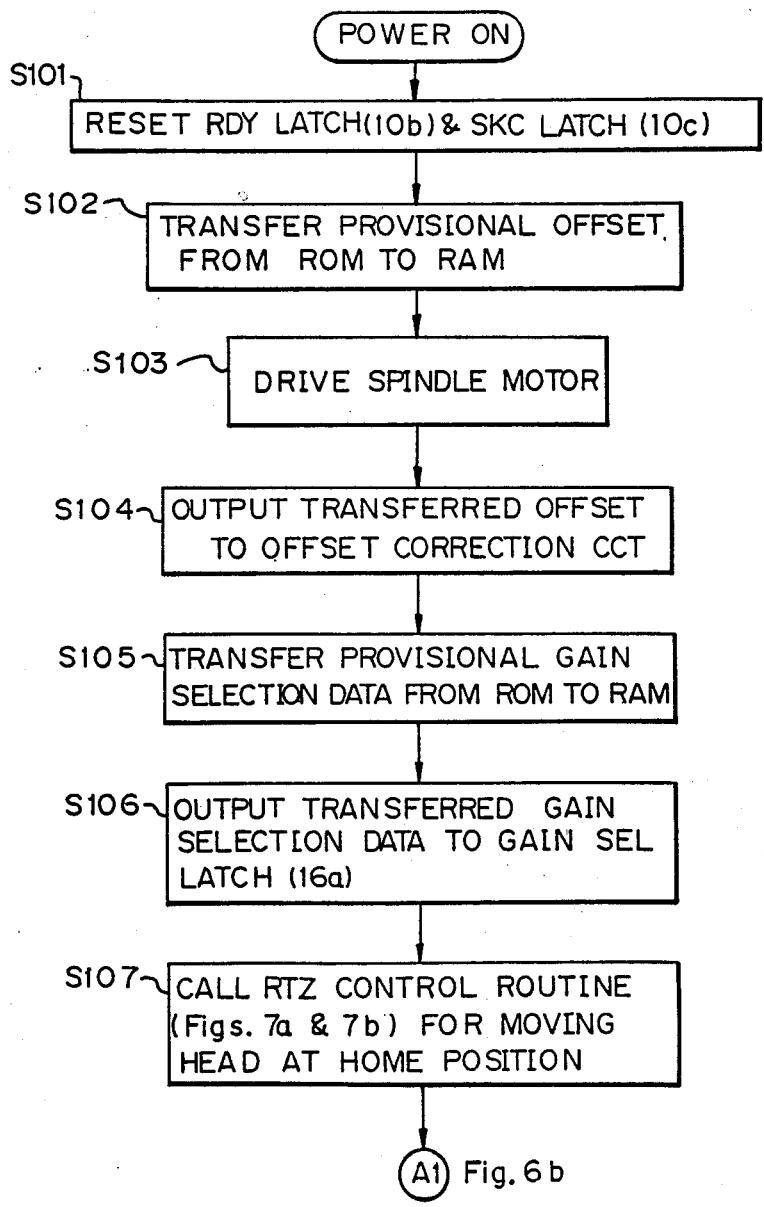

In FIG. 6a, upon power ON, the MPU 11 starts and first carries out an initialization, as shown by steps S101 to S106.

S101

The MPU 11 resets the ready signal latch 10b and the seek completion signal latch 10c in the I/F control circuit 10 of FIG. 4. This reset operation denotes that the magnetic disc drive system is not ready to receive a seek command, and thus, output of a seek command issued by the disk control unit 1 is inhibited.

S102

The MPU 11 reads a provisional offset correction value for a cylinder "0": a first cylinder, stored in the ROM 13, and stores that value in a first offset register (OFFSET REG1) of the offset register portion 12a in the RAM 12. The provisional offset correction value is previously obtained by experiment and is commonly used for each magnetic disc drive system.

S103

The MPU 11 starts a spindle motor (not shown) for rotating a magnetic disc, and waits until a speed of the spindle motor reaches a rated speed.

S104

The MPU 11 outputs the above transferred provisional offset correction value to the position offset correction circuit 18 of FIG. 5. In the position offset correction circuit 18, the DAC 18a converts the received offset correction digital value into an analog signal. The analog signal is amplified by the driver amplifier 18b and supplied to the speed signal generation circuit 59 as a provisional offset correction value OCV.

S105

The MPU 11 reads provisional speed gain selection data stored in the ROM 13 and stores that data in the RAM 12. The provisional speed gain selection data is commonly predetermined for magnetic disc drive systems and stored in the ROM 13 of FIG. 4.

S106

The MPU 11 outputs the transferred speed gain selection data to the gain selection signal latch 16a in the output register circuit 16-1 of FIG. 5. The switches SW1 to SWm in the speed gain selector 16-2 are energized in accordance with outputs of the gain selection signal latch 16a to define a resistance of a combination of the parallel-connected resistors R0 to Rm. The combined resistance corresponds to a speed gain.

S107

The MPU 11 calls for a return-to-zero (RTZ) control routine and transfers program control thereto, for moving the magnetic head 51 to a home position where a cylinder position is zero.

The RTZ control will be described with reference to FIGS. 4, 5 and 7a, 7b.

S201

The data stored in the first offset register OFFSET REG1 of the offset register portion 12a of FIG. 4 is output to the position offset correction circuit 18 of FIG. 5.

S202

A first reference speed is output to the reference speed generation circuit 17. The first reference speed indicates a direction for moving the magnetic head 51 to an outer cylinder and a value thereof is very small compared with a normal speed value for a normal seek operation. The first reference speed is commonly predetermined for magnetic disc drive systems and also previously stored in the ROM 13. The reference speed generation circuit 17 outputs a reference speed signal REF-SPD having a voltage corresponding to the first reference speed, via the DAC 17a and the drive amplifier 17b.

S203

The guard band latch 19b in the input register circuit 19 of FIG. 4 is reset.

S204

The mode latch 16b of FIG. 5 is set to "1" directing a start of the coarse operation: the seek operation. The MODE signal of "1" is output to the multiplexer 54 to start the seek operation under the above condition.

S205

When the magnetic head 51 of FIG. 3 reaches the guard band, the position information detection circuit 56c outputs a GUARD-BAND signal "1", setting the guard band latch 19b of FIG. 4. The MPU 11 waits until the guard band latch 19b is set.

S206

A second reference speed is output to the reference speed generation circuit 17 of FIG. 5. The second reference speed is in a direction for moving the magnetic head 51 for an inner cylinder. In other words, the direction of the second reference speed is the reverse of that of the first reference speed. An amplitude of the second reference speed is equal to that of the first reference speed. The second reference speed is also previously determined and stored in the ROM 13. As the MODE signal is "1", the coarse control is restarted under the above conditions, and as a result, the magnetic head 51 may be moved to the inner cylinder from the guard band.

S207

When the magnetic head 51 of FIG. 3 leaves the guard band, the position information detection circuit 56c outputs a GUARD-BAND signal "0", resetting the guard band latch 19b. The MPU 11 detects the leaving of the magnetic head 51 from the guard band by checking the reset of the guard band latch 19.

S208

A third reference speed is output to the reference speed generation circuit 17. The third reference speed has an amplitude smaller than that of the second reference speed, to move the magnetic head 51 more slowly. A direction thereof is the same as to that of the second reference speed. The third reference speed is previously determined and stored in the ROM 13.

S209

The cylinder cross latch 19a in the input register circuit 19 is reset.

S210

The difference of the cylinder "0" is stored in the difference register portion 12c of FIG. 4. The difference is two in this embodiment because the cylinder "0" is provided two cylinders in from the guard band.

S211

The magnetic head 51 of FIG. 3 is moved to the inner cylinder under the third reference speed. The position information detection circuit 56c outputs a CYLINDER-CROSS signal "1" when the magnetic head 51 moves across a cylinder. The cylinder cross latch 19a is set by the CYLINDER-CROSS signal. The MPU 11 detects that the magnetic head 51 has moved across a cylinder by checking the setting of the cylinder cross latch 19a.

S212, S213

When the MPU 11 detects a move across the cylinder by the magnetic head 51, the MPU 11 resets the cylinder cross latch 19a (S212) and decrements the difference in the difference register portion 12c by one (S213).

S214

The steps S211 to S213 are continued until the difference becomes zero, i.e., until the magnetic head 51 reaches the cylinder "0"; the home position.

S215, S216

After completion of placing the magnetic head 51 at the home position, the MPU 11 resets the mode latch 16b to change the mode from the coarse mode to the fine mode (S215). The MPU 11 waits for a settling time (S216), and then restores the program control to the main routine.

Figure 6C:
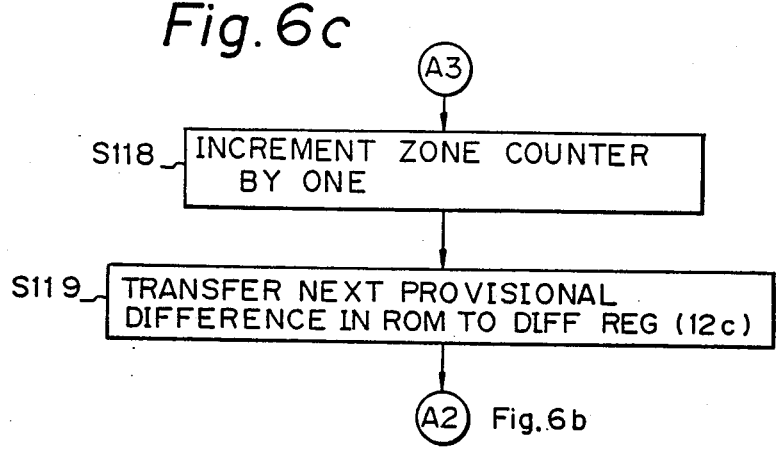
Figure 9:
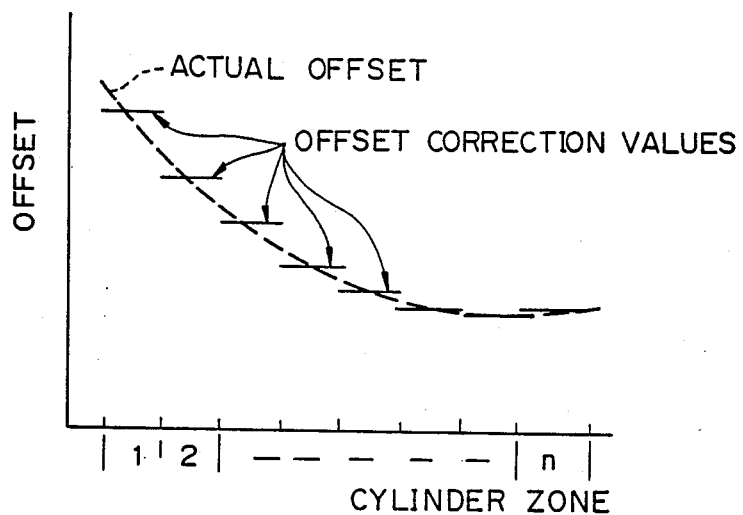
FIG. 9 is a graph representing offset correction values obtained by the magnetic disc drive system shown in FIGS. 3 to 5.

After completion of the RTZ control, the MPU 11 carries out the position offset adjustment shown in steps S110 to S119 of FIGS. 6b and 6c. The position offset adjustment is performed about n blocks of the cylinder zones as shown in FIG. 9. In FIG. 9, a dotted line shows an actual offset, and short solid lines show offset correction values for each cylinder zone.

S110 to S112

The MPU 11 clears the current position register portion 12b, because the magnetic head 51 is at the home position (S110). The MPU 11 reads a difference which indicates a distance between a target cylinder position of a cylinder zone 1 and the position of the cylinder "0" previously stored in the ROM 13, and stores it in the difference register portion 12c (S111). The MPU 11 sets a zone counter (not shown) in the RAM 12 to one (S112).

S113

The MPU 11 calls for a seek control routine for moving the magnetic head 51 to the above target cylinder, and transfers program control to the seek control routine.

Figure 8B:
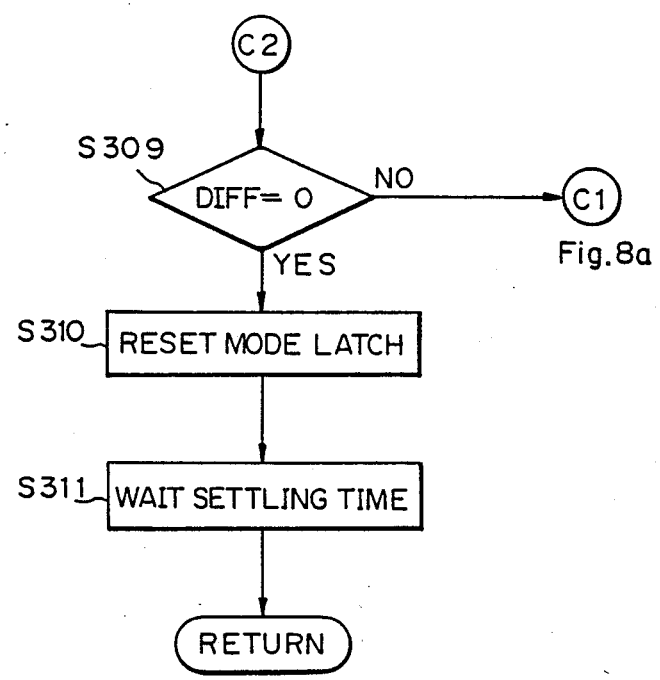

The seek control will be briefly described with reference to FIGS. 8a and 8b.

S301

The difference stored in the difference register portion 12 is added to the current position stored in the current position register portion 12b, thus obtaining an actual target cylinder address.

S302

The offset correction value stored in the corresponding offset register portion 12a is output to the position offset correction circuit 18. When the zone counter is one, the offset correction value stored in OFFSET REG1 of the offset register portion 12a is output. The seek control routine is used not only for the offset adjustment and the speed gain adjustment but also for the normal seek control. When the seek control routine is called for at step S113 of FIG. 6b, the provisional offset correction value is stored at step S102 of FIG. 6a. Accordingly, the provisional offset correction value is output at this stage.

S303

The cylinder cross latch 19a is reset.

S304

The mode latch 16b is set to designate the coarse mode: the seek operation.

S305

Figure 10:
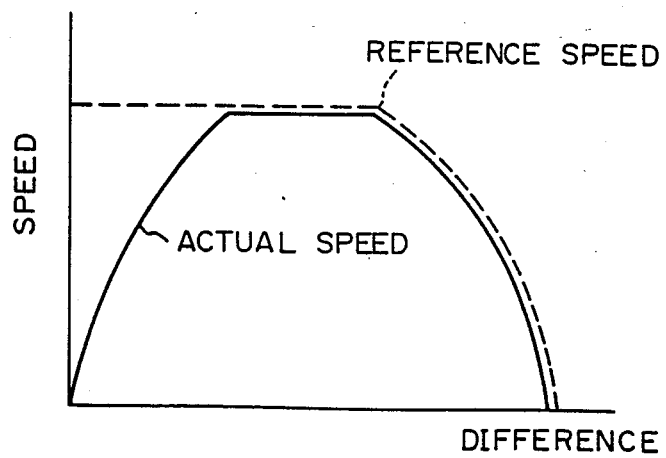
FIG. 10 is a graph representing a speed control curve applied in the magnetic disc drive system shown in FIGS. 3 to 5.

The MPU 11 reads a reference speed corresponding to the difference stored in the difference register portion 12c. The reference speed depends on the difference as shown by dotted lines in FIG. 10. The reference speed curve shown in FIG. 10 is stored in the reference speed data storage portion 13a in the ROM 13 as a table. The MPU 11 reads a corresponding reference speed and outputs it to the reference speed generation circuit 17.

The magnetic head 51 is moved to the target cylinder subject to the reference speed.

S306

The position information generation circuit 56c of FIG. 3 outputs the CYLINDER-CROSS signal when the magnetic head 51 moves across a cylinder, and sets the cylinder cross latch 19a. The MPU 11 detects the setting of the cylinder cross latch 19a.

S307 to S309

The MPU 11 resets the cylinder cross latch 19a (S307), and decrements the difference stored in the difference register 12c by one (S308).

The above operations of steps S305 to S308 are continued until the difference becomes zero (S309), at which time the magnetic head 51 is positioned at the target cylinder.

S310, S311

The MPU 11 resets the mode latch 16b, thus calling for a fine mode operation (S310), and restores the program control to the main routine in FIG. 6b after waiting for a settling time (S311).

S114 to S116

The MPU 11 reads the control current ICNT from the control current detection circuit 55 via the ADC 14 (S114). As described before, the control current ICNT indicates a position offset when the position of the magnetic head 51 is finely controlled at the target cylinder. Next, the MPU 11 calculates an actual offset correction value S115, FIG. 6b. The calculation is effected by the following formula:

$$OCV = \frac{ICNT_R}{a} \quad (1)$$

where,

OCV: a calculated offset correction value,
$ICNT_R$: a read of the control current, and
a: a circuit gain.

The calculated offset correction value OCV is stored in the corresponding OFFSET REG in the offset register portion 12a, defined by the zone counter (S116). The calculated offset correction value OCV is provisionally stored in a next OFFSET REG for use in the next offset adjustment.

S117, S118, S119

The operation of steps S113 to S116 is repeated until the zone counter reaches n (S117). If the zone counter has not reached n, the MPU 11 adds to the zone counter S118, FIG. 6c. The MPU 11 also transfers a next difference from the ROM 13 to the difference register 12c in the RAM 12 (S119), and thereafter, the MPU 11 carries out above steps S113 to S116.

Figure 6D:
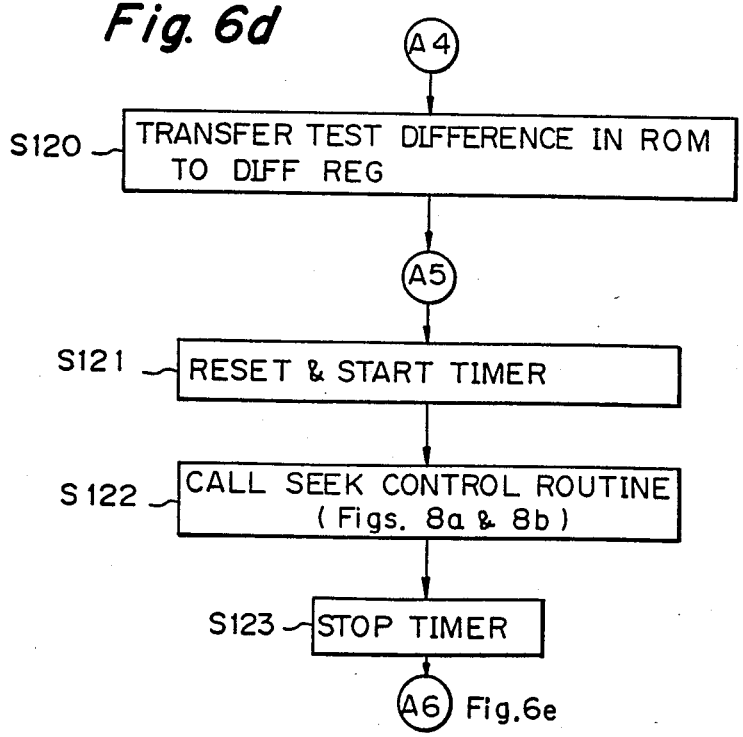
Figure 6E:
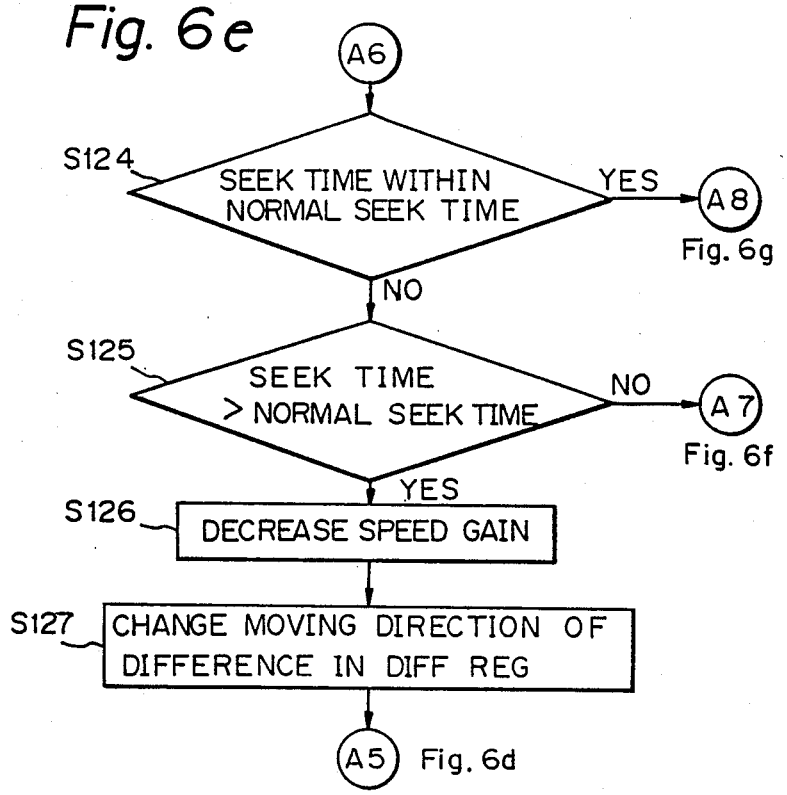
Figure 6F:
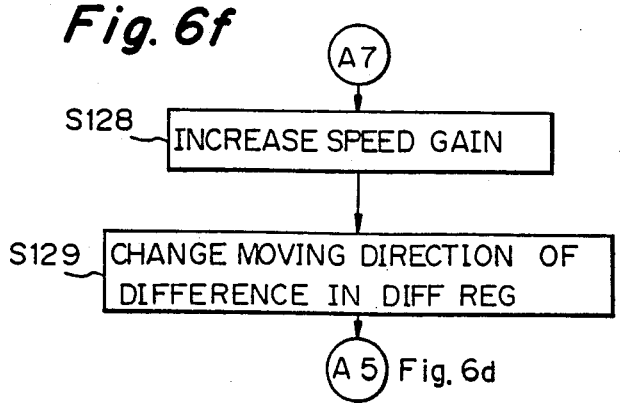
Figure 6G:
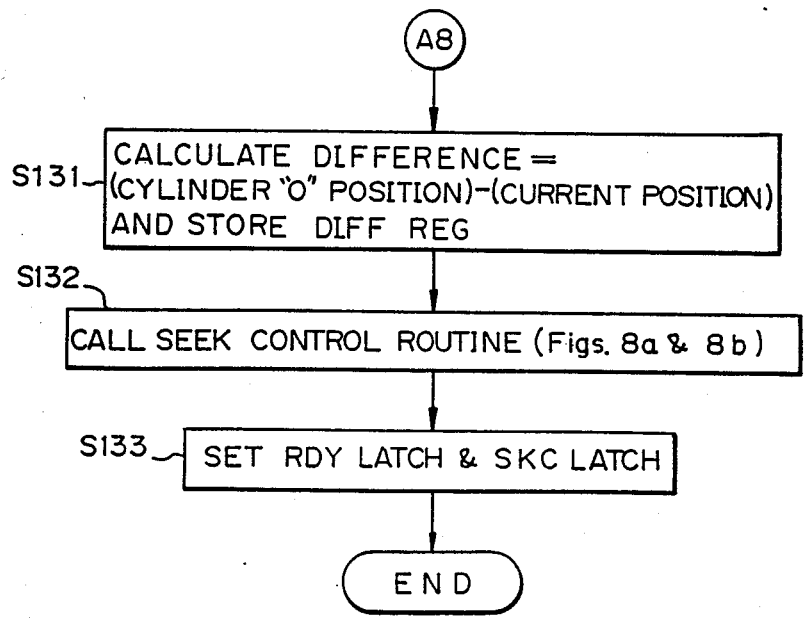
Figure 7B:
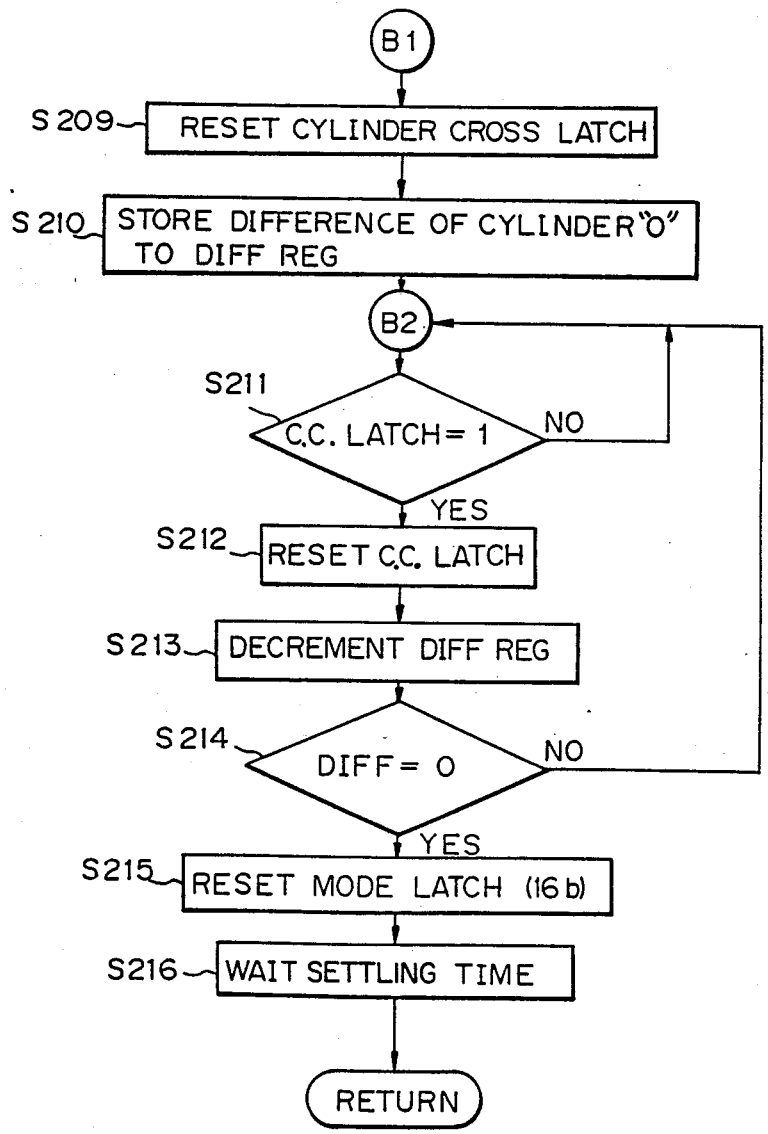

If the zone counter reaches n, the offset adjustment is completed, and then the MPU 11 carries out the speed gain adjustment as shown by steps S120 to S129 in FIGS. 6d, 6e and 6f.

S120

The MPU 11 reads a test difference from the ROM 13 and stores it in the difference register portion 12c. The test difference is a difference at a cylinder for adjusting the speed gain. This test difference is previously determined and stored in the ROM 13.

S121 to S123

The MPU 11 resets and starts the timer 21 (S121). The MPU 11 then calls for the seek control routine as described above with reference to FIGS. 8a and 8b (S122), and as a result, the magnetic head 51 is moved to the test cylinder. After completion of the seek control, the program control is sent to step S123. The MPU 11 then stops the timer 21 (S123), which indicates a seek time.

S124, S125

If the measured seek time is not within a normal seek time stored in the ROM 13, the program control is transferred to step S125. When the measured seek time is longer than the normal seek time, the program control is transferred to step S126. When the measured seek time is shorter than the normal seek time, program control is transferred to step S128.

S126, S127

The MPU 11 decreases the speed gain by one unit (S126). This can be effected by outputting gain selection data reduced by one to the gain selection latch 16a. Next the MPU 11 reverses a direction (the sign) of the difference for moving the magnetic head 51 (S127), and the MPU 11 returns to step S121 to repeat the seek time measurement.

S128, S129

The MPU 11 increases the speed gain by one unit (S128), and reverses the direction of the difference (S129). The MPU 11 then returns to step S121 to measure the seek time.

The above steps S126 and S127 or the steps S128 and S129 are repeated until the seek time is within the normal seek time (S124).

S124, S131 to S133

When the measured seek time is within the normal seek time, the speed gain is automatically adjusted to meet the requirements of the seek control under the adjusted offset correction values. Then, the MPU 11 calculates a difference to move the magnetic head 51 to the cylinder "0"; the home position, and stores it in the difference register portion (S131). The MPU 11 then calls for the seek control routine (S132), and as a result, the magnetic head 51 is moved to the cylinder "0".

The MPU 11 then sets the ready latch 10b and the seek completion latch 10c (S133), and thus the adjustment is completed.

Upon receipt of the READY signal from the ready latch 10b and the SEEK COMPLETION signal from the seek completion latch 10c, the disk control unit 1 outputs a normal seek command.

The normal seek command control is carried out by using the offset correction value and the adjusted speed control gain. FIG. 11 shows the seek command control procedure. Note, the seek command control, per se, is known, and thus a description thereof is omitted.

To improve the accuracy of the offset correction values, the operation of steps S113 to S116 shown in FIG. 6b can be repeated for each cylinder zone, and each offset correction value can be averaged for several calculated offset correction values for each cylinder zone. Similarly, the operation of the seek time measurement and the determination of the speed control gain can be repeated, and a final speed gain can be averaged for several adjusted speed control gains. However, the above repetition should be limited to a reasonable time, because of the need for a shortening of the adjustment time.

In the above embodiment, a combination of the offset correction adjustment and the speed control gain adjustment is described. The present invention naturally provides the offset correction adjustment and/or the speed control gain adjustment. Also, in the above offset correction adjustment, the adjustment was effected for a plurality of cylinder zones, as shown in FIG. 9, to achieve an optimum offset correction. However, to reduce the adjustment time, the adjustment for a single cylinder, as shown in FIG. 2, can be carried out.

Many widely different embodiments of the present invention may be constructed without departing from the spirit and scope of the present invention. It should be understood that the present invention is not limited to the specific embodiments described in this specification, except as defined in the appended claims.

I claim:

1. A magnetic disc drive system, comprising:
    a magnetic head for reading a magnetic disc;
    an actuator connected to and moving said magnetic head;
    a control current detection circuit connected to said actuator and detecting a control current flowing through said actuator;
    a position signal generation circuit coupled to said magnetic head and generating a position signal corresponding to a position of said magnetic head;
    a speed control circuit coupled to said control current detection circuit and effecting a seek control of said magnetic head;
    a position control circuit connected to said control current detection circuit and effecting a fine position control of said magnetic head after completion of said seek control; and
    offset adjustment means operatively connected to said speed control circuit, said position control circuit, said control current detection circuit and said position signal generation circuit, operating immediately upon receipt of power and before receipt of a seek command, for calculating one or more offset correction values along one or more cylinders of the magnetic disc dependent upon the detected control current from said control current detection circuit when a position of said magnetic head is controlled under said fine position control by said position control circuit, said offset adjustment means outputting said calculated one or more offset correction values to said speed control circuit and said position control circuit, said offset adjustment means controlling said speed control circuit to effect the seek control responsive to a normal seek command in accordance with said calculated one or more offset correction values, and controlling said position control circuit to effect the fine position control in accordance with said calculated one or more offset correction values after completion of the seek control by said speed control circuit.

2. A magnetic disc drive system according to claim 1, further comprising:
    speed control gain adjustment means, operatively connected to said speed control circuit and said position signal generation circuit, for determining a speed control gain for controlling said speed control circuit after determination of said calculated one or more offset correction values by said offset adjustment means, said speed control gain adjustment means determining said speed control gain by seeking said magnetic head to a predetermined cylinder in accordance with said calculated one or more offset correction values and by measuring a time for the seek in accordance with a reference seek time, said speed control circuit effecting the seek control responsive to a normal seek command and in accordance with said determined speed control gain.

3. A magnetic disc drive system according to claim 2, wherein said speed control gain adjustment means comprises a plurality of resistors connected in parallel and a plurality of switches each serially-connected to a corresponding resistor, said resistors having a predetermined relationship of respective resistance values, and a combination of resistances determined by said switches of said parallel connected resistors defining said speed control gain.

4. A magnetic disk drive system according to claim 1, wherein said offset adjustment means comprises means for calculating offset correction values along a plurality of cylinder zones.

* * * * *

UNITED STATES PATENT AND TRADEMARK OFFICE
CERTIFICATE OF CORRECTION

PATENT NO. : 4,907,109
DATED : MARCH 6, 1990
INVENTOR(S) : KEIICHO SEINO

It is certified that error appears in the above-identified patent and that said Letters Patent is hereby corrected as shown below:

FRONT PAGE, In the caption, "Seino" should be --Seino--;

[75] Inventor: "Seino" should be --Seino--.

Col. 3, line 62, "but" should be deleted.

Col. 12, line 21, "determination" should be --completion--.

Signed and Sealed this

Eleventh Day of June, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,907,109

DATED : March 6, 1990

INVENTOR(S) : Keiichi Seino

It is certified that error appears in the above-identified patent and that said Letters Patent is hereby corrected as shown below:

Title page:

[75] Inventor: "Keich_o_" should be --Keiich_i_--.

Signed and Sealed this

First Day of October, 1991

Attest:

Attesting Officer

HARRY F. MANBECK, JR.

Commissioner of Patents and Trademarks